Feb. 2, 1932.  W. R. FREEMAN ET AL  1,843,218
BRAKE CONTROL MECHANISM
Filed Dec. 26, 1929
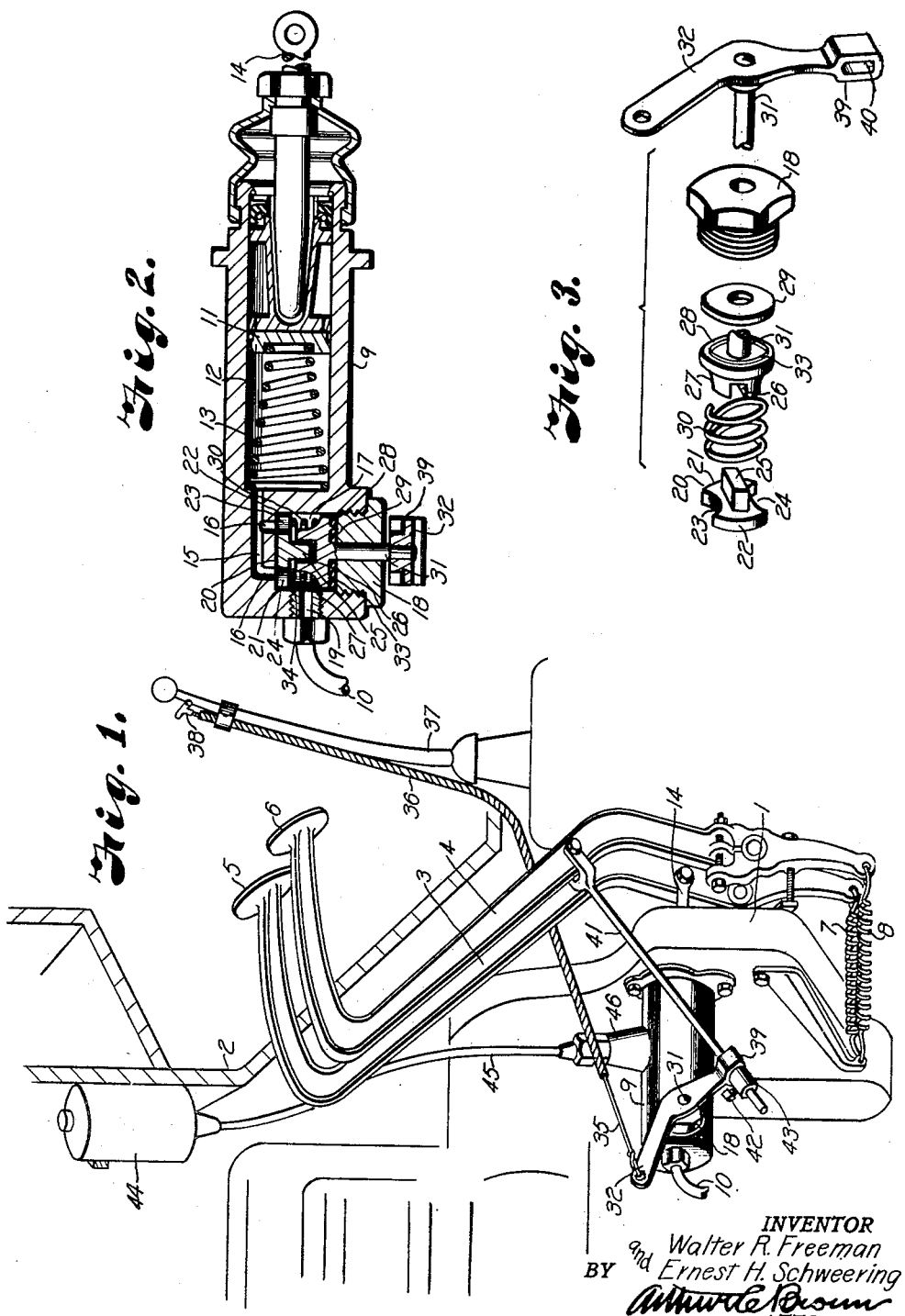
INVENTOR
Walter R. Freeman
and Ernest H. Schweering
BY
Arthur LeBrown
ATTORNEY Patented Feb. 2, 1932

1,843,218

UNITED STATES PATENT OFFICE

WALTER R. FREEMAN AND ERNEST H. SCHWEERING, OF TULSA, OKLAHOMA

BRAKE CONTROL MECHANISM

Application filed December 26, 1929. Serial No. 416,691.

Our invention relates to hydraulic brakes for motor driven vehicles, and more particularly to apparatus for controlling such brakes in congested traffic, the present invention being an improvement on the apparatus disclosed in our co-pending applications, Serial Numbers 312,490 and 350,208, and having for its principal object to relieve the driver of a vehicle from the leg strain occasioned by frequent application of the brake pedal during interrupted travel for short periods, such as occurs in congested traffic.

With brakes of this type, the individual brake members are usually operated by a fluid pressure medium, preferably oil, supplied to local cylinders from a master cylinder in response to depression of a foot brake lever. When traffic stops are for such short periods that the driver does not wish to employ the customary emergency brake mechanism, the fluid is retained in the local cylinders and supply line by continued depression of the foot lever during the period of interrupted travel, under a pressure sufficient to induce strain, particularly if the period is of any considerable duration.

With our apparatus, the brakes when set may, if desired, be retained by cutting off return of the fluid pressure medium, hereafter referred to as oil, to the master cylinder, and the brakes released automatically by opening of the supply line in response to release of the clutch lever.

It is a further object of our invention to embody safety features in our apparatus for permitting actuation of the foot brake lever after return flow of oil to the master cylinder has been cut off.

In accomplishing these and other objects of our invention, we have provided improved details of structure, the preferred forms of which are shown in the accompanying drawings, wherein:

Fig. 1 is a perspective view of hydraulic brake control mechanism embodying our invention.

Fig. 2 is an enlarged longitudinal section of a master cylinder of ordinary construction except as hereinafter stated.

Fig. 3 is an enlarged detail perspective view of the master cylinder valve parts in spaced but sequential relation.

Referring more in detail to the drawings:

1 indicates a cross frame member and 2 the dash board of a motor vehicle, having the usual foot brake and clutch levers 3 and 4, provided with pedals 5 and 6 and yieldingly retracted by springs 7 and 8 to retain the brakes off and the clutch in, in accordance with ordinary practice.

Mounted on the cross frame member 1 is the master cylinder 9 of an hydraulic brake system, including a line 10 for supplying fluid pressure medium, such as oil, to the local brake cylinders (not shown) in response to forward thrust of a piston 11 in the cylinder chamber 12 against the tension of a spring 13 contained within the chamber, when the brake lever is depressed; the piston being connected with the brake lever by a rod 14 to reciprocate with the lever.

Leading from the outer end of the chamber 12 is a channel 15 having ports 16 opening to a valve chamber 17, normally closed by a plug 18 and having a port 19 in open communication with the supply line 10.

Seated in the bottom of the chamber 17 is a plate valve 20 having opposite wings 21 and 22 adapted for closing the ports 16, and opposite recesses 23 and 24 curved on a radius greater than that of the ports, to facilitate graduated opening and closing of the ports in accordance with common practice.

On the outer end of the plate valve is a squared boss 25 slidably seated in a squared socket 26 in the end of a tapered head 27 having a flat face 28 bearing on packing 29, preferably formed of rubber composition and seated against the inner end of the plug 18. An expansion spring 30 on the head 27 bears against the plate valve to urge the valve to its seat while permitting rotation of the valve when the head is turned to right or left by a stem 31, which extends through the packing 29 and plug 18 and carries an actuating crank 32, preferably of bell crank form.

The bearing face 28 is further provided with a concentric seating ring 33 to insure a positive seal between the stem 31 and valve chamber 17 when no liquid pressure is applied to the head 27.

As clearly shown in Fig. 2, a space 34 is reserved between the valve 20 and head 27 so that pressure from the piston 11 may depress the valve 20 against tension of the spring 30 and actuate the brakes, if for any reason the valve 20 has been rotated and closed before application of the brakes.

Connected with one end of the actuating lever is a flexible wire or cord 35 extending through a conduit 36 preferably attached to a gear shift lever 37 of the vehicle, the wire being provided on its outer end with a handle 38.

On the other end of the lever 32 is a boss 39 having an elongated slot 40.

Pivotally mounted on the clutch lever 4 is a rod 41 which extends slidably through the slot 40, and adjustably mounted on the outer end of said rod by a set screw 42 is a stop collar 43 for engaging the boss 39 to retract the crank lever when the clutch lever is released under the conditions presently described.

44 designates a reserve oil container mounted on the dash board 2 and connected with the cylinder 9 through a line 45, and a check valve fitting 46, in accordance with common practice.

When a vehicle equipped with the mechanism described is required to make a stop for a brief period, as when travelling in congested traffic, the driver depresses the clutch lever to release the motor clutch and depresses the brake lever to set the brakes; the rod 47 on the clutch lever sliding in the slot in the boss on the bell crank lever 32 without affecting the lever, and the rod 14 on the brake lever operating the piston to force oil from the master cylinder through the supply line to the local brake cylinders.

If the stop is but momentary, the driver retains both levers depressed until the brakes are to be released and the clutch thrown in to start the vehicle, the bell crank lever and its connecting valve being unaffected by the operation and the brakes released merely by return of the oil to the cylinder, permitted by shift of the piston with the brake lever.

If, however, the stop is to be for such an extended period as to induce strain from protracted pressure on the brake lever, the driver, after depressing the brake lever, closes the valve in the oil supply line by pull on the handle 38 and removes his foot from the brake lever, the closing of the valve trapping the oil in the line so that it can not return into the master cylinder and release the brakes.

The clutch lever being held depressed while the valve is closed and the brake lever is released, the boss on the bell crank lever slides over the rod 41 to or near engagement with the stop collar 43, and when the clutch lever is released, the collar on the rod engages the boss on the lever and works the lever back to open the valve, thereby opening the supply line to the master cylinder and releasing the brakes.

Thus, by such semi-automatic control of the brake mechanism, the driver of a vehicle is relieved of much of the strain of driving in congested traffic, without sacrifice of safety.

What we claim and desire to secure by Letters Patent is:

1. A control apparatus for hydraulic brake mechanism including brake and clutch levers of a vehicle having individual brake cylinders, a master cylinder having a line for supplying fluid into said individual brake cylinders, a piston in the master cylinder operable by the brake lever, a normally open valve for said supply line, manually operable means for closing the valve to trap fluid in the supply line, and means for opening the valve in response to return movement of the clutch lever.

2. A control apparatus for hydraulic brake mechanism including brake and clutch levers of a vehicle, a master cylinder having a line for supplying fluid to the individual cylinders of a braking system, a piston in the master cylinder operable by the brake lever, a valve for said supply line, a stem for said valve, a crank to close the valve, a rod between the clutch lever and crank, and an adjustable slip connection between the rod and crank for enabling operation of the clutch lever independently of the crank and for shifting the valve lever to open the valve in response to return movement of the clutch lever when the valve has been closed.

3. A control apparatus for hydraulic brake mechanism including brake and clutch levers of a vehicle provided with brake operating means, a control member having a line for supplying fluid to said brake operating means, a piston in the control member, operable by the brake lever, a valve for said supply line, a lever operably connected with said valve, manually operable means for shifting the lever to close the valve, a rod connected with the clutch lever and slidable in the valve lever to permit operation of the clutch lever independently of operation of the valve, and a stop on said rod engageable with the valve lever to effect opening of the valve in response to return movement of the clutch lever.

4. A control apparatus for hydraulic brake mechanism including brake and clutch levers of a vehicle, a master cylinder having a line for supplying fluid to individual brake operating cylinders, a piston in the master cylinder operable by the brake lever, a valve for said supply line, a stem on said valve, a bell crank lever on said stem, a flexible member attached to one end of said lever for closing the valve, a rod on the clutch lever slidable in the other end of the valve lever, and a stop on said rod engageable with the valve lever to open the valve in response to return movement of the clutch lever.

5. In control apparatus for hydraulic brake mechanism including brake and clutch levers of a vehicle having individual brakes and their operating mechanism, a master cylinder having a line for supplying fluid to said brake operating mechanism, a piston in the master cylinder operable by the brake lever, a normally open valve for said supply line, manually operable means for closing the valve against return flow of fluid from the brake cylinders to the master cylinder, and means for opening the valve in response to return movement of the clutch lever.

6. A control apparatus for hydraulic brake mechanism including brake and clutch levers of a vehicle having brakes and their operating means, a control means having a line for supplying fluid to said brake operating means, a piston in the control means operable by the brake lever, a normally open valve for said supply line, manually operable means for closing the valve against return flow of fluid from the brake operating means to the control means but permitting flow of fluid under pressure from the master cylinder to the brake operating means, and means for opening the valve in response to return movement of the clutch member.

7. A control apparatus for hydraulic brake mechanism including brake and clutch levers of a vehicle having individual brake operating means, a master cylinder having a line for supplying fluid to said individual brake operating means, a piston in the master cylinder operable by the brake lever, a valve for said supply line comprising a valve stem having a head and a valve plate interlockingly engaging said head, a lever connected with said valve, manually operable means for shifting the lever to close the valve, a rod connected with the clutch lever and slidable in the valve lever to permit operation of the clutch lever independently of operation of the valve, and a stop on said rod engageable with the valve lever to effect opening of the valve in response to return movement of the clutch lever.

8. A control apparatus for hydraulic brake mechanism including brake and clutch levers of a vehicle having individual brake cylinders, a master cylinder having a line for supplying fluid to aid individual cylinders, a piston in the master cylinder operable by the brake lever, a valve for said supply line comprising a head, a valve plate reciprocably interlocked with said head, a sealing ring on said head, manually operable means for closing the valve to trap fluid in the supply line, and means for opening the valve in response to return movement of the clutch lever.

9. A control apparatus for hydraulic brake mechanism including brake and clutch levers of a vehicle having individual brake cylinders, a master control having a line for supplying fluid to said individual cylinders, a piston in the master control operable by the brake lever, a normally open valve for said supply line comprising a head, said head having an annular sealing ring, wedge shaped in cross section, a composition washer adapted to engage said sealing ring, manually operable means for closing the valve to trap fluid in the supply line, and means for opening the valve in response to return movement of the clutch member.

10. A control apparatus for hydraulic brake mechanism including brake and clutch levers of a vehicle having brakes and their operating means, a control member having a line for supplying fluid to said brake operating means, a piston in the control member operable by the brake lever, a valve for said supply line comprising a head, a valve plate reciprocably interlocked with said head, yielding means between said head and valve plate, manually operable means for closing the valve against return flow of fluid from the brake operating means to the control member but permitting flow of fluid under pressure from the control member to the brake operating means, and means for opening the valve in response to return movement of the clutch member.

11. A control apparatus for a fluid-operated brake unit in combination with clutch-controlled mechanism including a lever, a fluid supply line for said brake unit, a normally open valve in said supply line, manually operable means for closing said valve, and means for opening the valve in response to return movement of the clutch lever.

12. In a vehicle provided with clutch-controlled mechanism and with a fluid-operated brake unit, the combination of a conduit for conveying operating fluid to the braking unit, a normally open valve in said conduit, manually operable means for closing said valve, and means operable in response to a predetermined movement of an element of the clutch-controlled mechanism for opening said valve.

In testimony whereof we affix our signatures.

WALTER R. FREEMAN.
ERNEST H. SCHWEERING.